(12) United States Patent
Zhong et al.

(10) Patent No.: US 6,359,096 B1
(45) Date of Patent: Mar. 19, 2002

(54) SILICONE RESIN COMPOSITIONS HAVING GOOD SOLUTION SOLUBILITY AND STABILITY

(75) Inventors: Bianxiao Zhong; Russell Keith King; Kyuha Chung; Shizhong Zhang, all of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/425,306

(22) Filed: Oct. 25, 1999

(51) Int. Cl.$^7$ ............................................... C08G 77/12
(52) U.S. Cl. ............................... 528/12; 528/14; 528/31; 528/39; 556/451; 106/287.14
(58) Field of Search ............................... 528/10, 12, 14, 528/31, 39; 524/361, 364, 315; 106/287.14; 556/451, 458

(56) References Cited

U.S. PATENT DOCUMENTS

| | | | |
|---|---|---|---|
| 3,615,272 A | 10/1971 | Collins et al. | 528/31 |
| 4,017,528 A | 4/1977 | Unger et al. | 260/448.8 R |
| 4,756,977 A | 7/1988 | Haluska et al. | 428/704 |
| 5,446,088 A * | 8/1995 | Haluska | 528/31 |
| 5,494,859 A | 2/1996 | Kapoor | 438/477 |
| 5,776,990 A | 7/1998 | Hedrick et al. | 521/77 |
| 6,015,457 A * | 1/2000 | Leung et al. | 528/31 |
| 6,022,814 A | 2/2000 | Mikoshiba et al. | 438/789 |
| 6,232,424 B1 * | 5/2001 | Zhong et al. | 528/12 |

FOREIGN PATENT DOCUMENTS

| | | | |
|---|---|---|---|
| JP | 9-286533 | 10/1998 | C08G/77/04 |
| JP | 10-287746 | 10/1998 | C08G/77/04 |
| WO | 98/47945 | 10/1998 | C08G/77/12 |
| WO | 98/49721 | 11/1998 | H01L/21/316 |

OTHER PUBLICATIONS

Mikoskiba et al., Journal of Materials Chemistry, 1999, 9, 591–598. (Month Unknown).

* cited by examiner

Primary Examiner—Daniel S. Metzmaier
(74) Attorney, Agent, or Firm—William F. Boley; Rick D. Streu; Sharon K. Severance

(57) ABSTRACT

Soluble silicone resin compositions having good solution stability and a method for their preparation. The silicone resin comprises the reaction product of a mixture comprising (A) 15–70 mol % of a tetraalkoxysilane described by formula $$Si(OR^1)_4,$$

where each $R^1$ is an independently selected alkyl group comprising 1 to about 6 carbon atoms, (B) 12 to 60 mol % of a hydrosilane described by formula $$HSiX_3,$$

where each X is an independently selected hydrolyzable substituent, (C) 15 to 70 mole percent of an organotrialkoxysilane described by formula $$R^2Si(OR^3)_3,$$

where $R^2$ is a hydrocarbon group comprising about 8 to 24 carbon atoms or a substituted hydrocarbon group comprising a hydrocarbon chain having about 8 to 24 carbon atoms and each $R^3$ is an independently selected alkyl group comprising 1 to about 6 carbon atoms; in the presence of (D) water,
(E) hydrolysis catalyst, and
(F) organic solvent for the reaction product.

42 Claims, No Drawings

SILICONE RESIN COMPOSITIONS HAVING GOOD SOLUTION SOLUBILITY AND STABILITY

BACKGROUND OF INVENTION

The present invention is soluble silicone resin compositions having good solution stability and a method for their preparation. The present silicone resins are useful to form nanoporous films having low dielectric constants.

Semiconductor devices often have one or more arrays of patterned interconnect levels that serve to electrically couple the individual circuit elements forming an integrated circuit (IC). These interconnect levels are typically separated by an insulating or dielectric film. Previously, a silicon oxide film formed using chemical vapor deposition (CVD) or plasma enhanced techniques (PECVD) was the most commonly used material for such dielectric films. However, as the size of circuit elements and the spaces between such elements decreases, the relatively high dielectric constant of such silicon oxide films is inadequate to provide adequate electrical insulation.

In order to provide a lower dielectric constant than that of silicon oxide, dielectric films formed from siloxane-based resins have found use. An example of such films are those formed from poly(hydrogen)silsesquioxane resins as described for example in Collins et al., U.S. Pat. No. 3,615,272 and Haluska et al. U.S. Pat. No. 4,756,977. While such films provide lower dielectric constants than CVD or PECVD silicon oxide films and also provide other benefits such as enhanced gap filling and surface planarization, typically the dielectric constants of such films are limited to approximately 3 or greater.

It is well known that the dielectric constant of the above discussed insulating films is an important factor where IC's with low power consumption, cross-talk, and signal delay are required. As IC dimensions continue to shrink, this factor increases in importance. As a result, siloxane based resin materials and methods for making such materials that can provide electrically insulating films with dielectric constants below 3 are desirable. In addition, it is desirable to have siloxane-based resins and method for making such resins that provide low dielectric constant films which have a high resistance to cracking. Also, it is desirable for such siloxane-based resins to provide low dielectric constant films by standard processing techniques.

It is known that the dielectric constant of solid films decrease with a decrease in density of the film material. Therefore considerable work is being conduct to develop nanoporous insulating films for use on semiconductor devices.

Kapoor, U.S. Pat. No. 5,494,859, describes a low dielectric constant insulating layer for an integrated circuit structure and a method of making the layer. A porous layer is formed by depositing on a structure a composite layer comprising an insulating matrix material and a material which can be converted to a gas upon subjection to a converting process. Release of the gas leaves behind a porous matrix of the insulating material which has a lower dielectric constant than the composite layer. The matrix forming material is typically silicon oxide and the material which can be converted to a gas upon subjection to a converting process is exemplified by carbon.

Hedrick et al., U.S. Pat. No. 5,776,990, describe an insulating foamed polymer having a pore size less than about 100 nm made from a copolymer comprising a matrix polymer and a thermally decomposable polymer by heating the copolymer above the decomposition temperature of the decomposable polymer. The copolymers described are organic polymers that do not contain silicon atoms.

Smith et al., WO 98/49721, describe a process for forming a nanoporous dielectric coating on a substrate. The process comprises the steps of blending an alkoxysilane with a solvent composition and optional water; depositing the mixture onto a substrate while evaporating at least a portion of the solvent; placing the substrate in a sealed chamber and evacuating the chamber to a pressure below atmospheric pressure; exposing the substrate to water vapor at a pressure below atmospheric pressure and then exposing the substrate to base vapor.

Mikoshiba et al., Japanese Laid-Open Patent (HEI) 10-287746, describe the preparation of porous films from siloxane-based resins having organic substituents which are oxidized at a temperature of 250° C. or higher. The useful organic substituents which can be oxidized at a temperature of 250° C. or higher given in this document include substituted and unsubstituted groups as exemplified by 3,3,3-trifluoropropyl, β-phenethyl group, t-butyl group, 2-cyanoethyl group, benzyl group, and vinyl group.

Mikoskiba et al., *J. Mat. Chem.*, 1999, 9, 591–598, report a method to fabricate angstrom size pores in poly (methylsilsesquioxane)films in order to decrease the density and the dielectric constant of the films. Copolymers bearing methyl(trisiloxysilyl) units and alkyl(trisiloxysilyl) units are spin-coated on to a substrate and heated at 250° C. to provide rigid siloxane matrices. The films are then heated at 450° C. to 500° C. to remove thermally labile groups and holes are left corresponding to the sized of the substituents. Trifluoropropyl, cyanoethyl, phenylethyl, and propyl groups were investigated as the thermally labile substituents.

Hacker et al., WO 98/47945, teach a method for reacting trichlorosilane and organotrichlorosilane to form organohydridosiloxane polymer having a cage conformation and between approximately 0.1 to 40 mole percent carbon-containing substituents. Resin formed from the polymers are reported to have a dielectric constant of less than about 3.

The objectives of the present invention include providing a silicone resin which is soluble in organic solvents such as toluene, has a useable solution shelf-life, and which is suitable for forming crack-free electrically insulating films on electronic devices. Another objective is to provide a silicone resin composition which after coating on a substrate can be heated to form a nanoporous film have a narrow pore size distribution and a low dielectric constant. Such low-dielectric constant films can be formed on electrical components such as semiconductor devices by conventional methods to form nanoporous crack-free films having a dielectric constant less than about 2.

SUMMARY OF INVENTION

The present invention is soluble silicone resin compositions having good solution stability and a method for their preparation. The present silicone resins are useful to form nanoporous films having low dielectric constants. The silicone resin comprises the reaction product of a mixture comprising (A) 15–70 mol % of a tetraloxysilane described by formula

Si(OR¹)₄, where each R¹ is an independently selected alkyl group comprising 1 to about 6 carbon atoms, (B) 12 to 60 mol % of a hydrosilane described by formula $$HSiX_3,$$

where each X is an independently selected hydrolyzable substituent, (C) 15 to 70 mole percent of an organotrialkoxysilane described by formula $$R^2Si(OR^3)_3,$$

where $R^2$ is a hydrocarbon group comprising about 8 to 24 carbon atoms or a substituted hydrocarbon group comprising a hydrocarbon chain having about 8 to 24 carbon atoms and each $R^3$ is an independently selected alkyl group comprising 1 to about 6 carbon atoms; in the presence of (D) water, (E) hydrolysis catalyst, and (F) organic solvent for the reaction product.

DESCRIPTION OF INVENTION

An embodiment of the present invention is a silicone resin which is soluble in standard solvents useful for applying dielectric coatings to electrical components. The silicone resin comprises the reaction product of a mixture comprising (A) 15–70 mol % of a tetraalkoxysilane described by formula $$Si(OR^1)_4, \quad (1)$$

where each $R^1$ is an independently selected alkyl group comprising 1 to about 6 carbon atoms, (B) 12 to 60 mol % of a hydrosilane described by formula $$HSiX_3, \quad (2)$$

where each X is an independently selected hydrolyzable substituent, (C) 15 to 70 mole percent of an organotrialkoxysilane described by formula $$R^2Si(OR^3)_3, \quad (3)$$

where $R^2$ is a hydrocarbon group comprising about 8 to 24 carbon atoms or a substituted hydrocarbon group comprising a hydrocarbon chain having about 8 to 24 carbon atoms and each $R^3$ is an independently selected alkyl group comprising 1 to about 6 carbon atoms; in the presence of (D) water, (E) hydrolysis catalyst, and (F) organic solvent for the reaction product.

Component (A) is a tetraalkoxysilane as described by formula (1). The present inventors have unexpectedly discovered that the presence of component (A) in the range of 15 mol % to 70 mol %, based upon the total moles of components (A)+(B)+(C) is critical to the solubility and stability of the silicone resin in organic solvents. If the mol % of component (A) is outside the described range, the silicone resin will be at least partially insoluble in typical organic solvents used to form solutions of such resins for applications as coatings. It is preferred that the mol % of component (A) be within a range of about 25 mol % to 50 mol %. In formula (1), each $R^1$ is an independently selected alkyl group comprising 1 to about 6 carbon atoms. $R^1$ can be, for example, methyl, ethyl, butyl, tert-butyl, and hexyl. It is preferred that component (A) be tetramethoxysilane or tetraethoxysilane, because of their easy availability.

Component (B) is a hydrosilane described by formula (2). Component (B) is added to the mixture in an amount of 12 mol % to 60 mol % based upon the total moles of components (A)+(B)+(C). Addition of component (B) in an amount outside the described range can limit the solubility of the resulting silicone resin in organic solvents. It is preferred that component (B) be added to the mixture in an amount of about 30 mol % to 50 mol %. In formula (2), X is a hydrolyzable substituent. X can be any substituent capable of hydrolyzing from the silicon atom in the presence of water under conditions of the described process and which groups when hydrolyzed do not adversely impact the solubility or end use of the silicone resin. Examples of hydrolyzable substituents include halogen, alkoxy groups, and acyloxy groups. Preferred is when X is an alkoxy group comprising 1 to about 6 carbon atoms. Component (B) can be, for example, trichlorosilane, trimethoxysilane, or triethoxysilane, with trimethyoxysilane and triethoxysilane being preferred.

Component (C) is an organotrialkoxysilane described by formula (3). Component (C) is added to the mixture in an amount of 15 mol % to 70 mol % based upon the total moles of components (A)+(B)+(C). Component (C) is important to providing a mechanism for providing microporosity to films formed from the silicone resin. Specifically, Component (C) comprises an unsubstituted or substituted hydrocarbon group, $R^2$, which can be removed from the silicon atom by thermolysis during a heating process thereby creating micropores in the resulting silicone resin coating. Therefore, the amount of component (C) added to the mixture is used to control the degree of porosity of the resulting silicone resin after heating to cure and remove the $R^2$ substituents by thermolysis. Generally, an amount of component (C) below about 15 mol % will result in silicone resin coatings having a porosity too little to impart optimal dielectric properties to the material and poor solubility in solvent, while an amount of component (C) above 70 mol % will result in a resin which may have limited solubility in organic solvents and inadequate physical properties such as crack resistance when used as a porous coating on a substrate. Preferred is when component (C) is added to the mixture in a range of about 15 mol % to 40 mol %.

In formula (3), $R^2$ is a hydrocarbon group comprising about 8 to 24 carbon atoms or a substituted hydrocarbon group comprising a hydrocarbon chain having about 8 to 24 carbon atoms. $R^2$ can be a linear, branched, or cyclic hydrocarbon group. The substituted hydrocarbon group can be substituted with such substituents as halogen, poly(oxyalkylene) groups described by formula —(O—(CH$_2$)$_m$)$_x$—CH$_3$ where m and x are both positive integers and preferably a positive integer of 1 to 6, alkoxy, acyloxy, acyl, alkoxycarbonyl, and trialkylsiloxy groups. Preferred is when $R^2$ is a linear alkyl group comprising about 8 to 24 carbon atoms. Even more preferred is when $R^2$ is a straight chained alkyl group comprising about 16 to 20 carbon atoms. Examples of $R^2$ include octyl, chlorooctyl, trimethylsiloxyoctyl, methoxyoctyl, ethoxyoctyl, nonyl, decyl, dodecyl, hexadecyl, trimethylsiloxyhexadecyl, octadecyl, and docosyl.

In formula (3), each $R^3$ is an independently selected alkyl group comprising 1 to about 6 carbon atoms. $R^3$ can, be for example, methyl, ethyl, propyl, isopropyl, butyl, heptyl, and hexyl. Preferred is when $R^3$ is either methyl or ethyl.

Specific examples of organotrialkoxysilanes represented by formula (3) include octyltriethoxysilane, octyltrimethoxysilane, octadecyltrimethoxysilane, hexadecyltrimethoxysilane, and dodecyltriethoxysilane.

Preferred is when the organotrialkoxysilane is selected from the group consisting of octyltriethoxysilane, octadecyltrimethoxysilane, and hexadecyltrimethoxysilane. Further examples of organotrialkoxysilanes include those described by the following formulas:

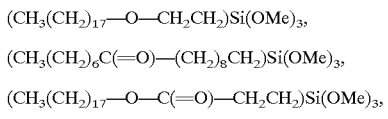

and

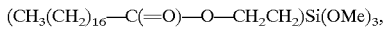

where Me is methyl.

Component (D) is water. It is preferred that component (D) be added in an amount sufficient to effect essentially complete hydrolysis of hydrolyzable groups bonded to the silicon atoms of components (A), (B), and (C) without an excess so great as to cause a two-phase mixture, which can slow down the reaction. Generally, it is preferred that the amount of water added be about 1.4 to 6 moles per mole of components (A), (B), and (C). Even more preferred is when the water is added in an amount of about 2.5 to 4.5 moles, on the same basis.

Component (E) is a hydrolysis catalyst and can be any of those organic or inorganic acids and bases known in the art to catalyze the hydrolysis of substituents from silicon atoms in the present of water. The hydrolysis catalyst can be in inorganic base such as potassium hydroxide or sodium hydroxide. The hydrolysis catalyst can be a inorganic acid such as hydrogen chloride, sulfuric acid, and nitric acid. The hydrolysis catalyst can be added separately to the reaction mixture, or in the case where component (B) is a trihalosilane may be at least partially generated in situ. A preferred hydrolysis catalyst is hydrogen chloride, at least a portion of which may be generated in situ when component (B) is trichlorosilane.

The amount of hydrolysis catalyst (catalytic amount) added to the reaction mixture can be any amount that facilitates the hydrolysis of the silicon-bonded hydrolytic groups of components (A), (B), and (C) and the optimal amount will depend upon the chemical composition of the catalyst as well as the temperature at which the hydrolysis reaction occurs. Generally, the amount of hydrolysis catalyst can be within a range of about 0.02 to 0.5 mole per mole of components (A), (B), and (C). Preferred is when the amount of hydrolysis catalyst is within a range of about 0.1 to 0.3 mole, on the same basis.

Component (F) is an organic solvent for the reaction product. Component (F) can be any organic solvent or mixture of organic solvents in which the reaction product forms a homogeneous solution. Examples, of useful solvents include ketones such as methylisobutylketone, aromatic hydrocarbon solvents such as toluene, xylene, and mesitylene, isobutyl isobutyrate, benzotrifluoride, propylbenzene, isobutyl propionate, propyl butyrate, parachlorobenzotrifluoride, and n-octane. The amount of organic solvent can be any amount sufficient to effect a homogeneous solution of the reaction product. In general it is preferred that the organic solvent comprise about 70 to 95 weight percent of the total weight of components (A) through (F), and preferably 85 to 95 weight percent.

In a preferred process for making the reaction product comprising the silicone resin, components (A), (B), (C), and (F) are combined to form a first mixture. Then components (D) and (E) are added, either separately or as a mixture, to the first mixture along with mixing to effect formation of the reaction product. The formation of the reaction product can be effected at any temperature within a range of about 15° C. to 100° C., with ambient temperature being preferred. In the preferred process after the resulting reaction is completed, volatiles are removed from the reaction product under reduced pressure to isolate a resin solution. Such volatiles include alcohol by-products, excess water, catalyst, and solvents. If desired all solvent can be removed from the resin solution to form a solid resin. When removing all solvents to isolate a solid resin, the temperature of the resin solution should be maintained below about 60° C. and preferably within a range of about 30° C. to 50° C. Excess heat can lead to the formation of insoluble resins. If desired the catalyst and alcoholic by-products may be separated from the reaction product by washing with or more washes of water with interim phase separation to recovered a solution of the silicone resin in solvent.

The silicone resin comprising the reaction product as described above contains Si—OH functionality and may contain Si—OR$^3$ functionality, where R$^3$ is as previously described. It is preferred that the silicone resin comprise about 10 to 30 mol % of SiOH and 0 to 10 mol % Si—OR$^3$.

A further embodiment of the present invention is a method to increase the molecular weight of and improve the storage stability of the reaction product comprising the silicone resin prepared as described above (hereafter in the alternative referred to as "bodying method". The bodying method comprises (i) forming a solution of the silicone resin in an organic solvent at about 10 to 60 weight percent in the presence of an optional condensation catalyst, (ii) heating the solution at a temperature sufficient to effect condensation of the silicone resin to a weight average molecular weight of about 100,000 to 400,000, and (iii) neutralizing the solvent solution of silicone resin. It is preferred that in step (i) of this method that the silicone resin be present at about 20 to 30 weight percent in the organic solvent. The organic solvent can be any of those organic solvents described above. The optional condensation catalyst added in step (i) can be any of those acid and bases described above as hydrolysis catalyst for forming the reaction product. A preferred condensation catalyst is hydrogen chloride at a concentration within the range of 5 to 200 weight parts HCl per million parts of resin solid. More preferred is when the condensation catalyst is hydrogen chloride at a concentration within the range of 10 to 50 weight parts HCl per million parts of resin solid.

The temperature at which the solution of silicone resin is heated in step (ii) can be from about 50° C. up to the reflux temperature of the solution. In a preferred method the solution of silicone resin is refluxed to effect the increase in weight average molecular weight. In step (ii) it is preferred that the solution be heated such that the silicone resin. after heating has a weight average molecular weight in the range of about 150,000 to 250,000. In step (iii) of the method the solvent solution of silicone resin is neutralized. Neutralization can be effected by washing the solution with one or more portions of water, or by removing the solvent under reduced pressure and redissolving the silicone resin in one or more portions of an organic solvent. The organic solvent used for the neutralization step can be any of the organic solvents described above.

The solution stability of the neutralized silicone resin can by further improved by dissolving the silicone resin in an organic solvent or organic solvent mixture and adding about 0.05 to 0.4 weight percent water, based upon the total weight of silicone resin, solvent, and water. Preferred is adding about 0.1 to 0.25 weight percent water, on the same basis. The organic solvent can be any of those organic solvents or mixtures thereof described above, with isobutyl isobutyrate being a preferred solvent.

The present silicone resins are particularly usefull as low dielectric constant films on electronic devices such as integrated chips, but may also be used for example as packing in chromatography columns. The silicone resins may be cured and heated to make porous by thermolysis of carbon-carbon bonds of the $R^2$ groups of component (C).

The following examples are provided to illustrate the present invention. These examples are not intended to limit the scope of the claims herein. In the Examples all parts are expressed as weight parts and mol % is based on the total moles of components (A)+(B)+(C) as described below. Molecular weight is reported as weight average molecular weight (Mw) as determined by gel permeation chromatography (GPC) using a toluene mobile phase and calibrated to polystyrene standards.

EXAMPLE 1

Samples 1–1 through 1–14

Silicone resins where prepared by combining in a glass container components (A), (B), (C), and (F) as described below in the amounts described in Table 1:

(A) tetraethoxysilane,
(B) triethoxysilane,
(C) octadecyltrimethoxysilane, and
(F) mixture of methyl isobutyl ketone (MIBK) and toluene (85:15 weight ratio).

To this mixture was added a mixture of (D) water and (E) hydrogen chloride in the amounts described in Table 1. In samples 1–1 through 1–14 the weight part of component (C) was 1. The resulting reaction product was stripped of volatiles under reduced pressure at 60° C. The solubility of the resulting solid silicone resin was tested for toluene solubility by adding 8.3 g of toluene to 1.7 g of the solid silicone resin 24 hours after stripping was completed. The solid was considered soluble in the toluene if a clear solution was formed and no particles or gels were visually observed. The toluene solubility is also reported in Table 1. The data presented in Table 1 demonstrate the importance of the mol % of components (A) and (B) on solubility of the silicone resin.

TABLE 1

The Effect of mol % of Components (A) and (B) on Silicone Resin Solubility in Toluene

| Sample | Wt. Parts | | | | | mol % | | Toluene |
|---|---|---|---|---|---|---|---|---|
| No. | (A) | (B) | (D) | (E) | (F) | (A) | (B) | Soluble |
| 1-1 | 0.56 | 1.32 | 0.84 | 0.078 | 12.0 | 20 | 60 | yes |
| 1-2 | 0.70 | 1.21 | 0.86 | 0.079 | 12.1 | 25 | 55 | yes |
| 1-3 | 0.84 | 1.10 | 0.87 | 0.080 | 12.2 | 30 | 50 | yes |
| 1-4 | 0.97 | 0.98 | 0.88 | 0.081 | 12.2 | 35 | 45 | yes |
| 1-5 | 1.11 | 0.88 | 0.90 | 0.082 | 12.3 | 40 | 40 | yes |
| 1-6 | 1.25 | 0.77 | 0.91 | 0.084 | 12.4 | 45 | 35 | yes |
| 1-7 | 1.39 | 0.66 | 0.92 | 0.085 | 12.5 | 50 | 30 | yes |
| 1-8 | 1.67 | 0.44 | 0.95 | 0.087 | 12.6 | 60 | 20 | yes |
| 1-9 | 1.81 | 0.33 | 0.96 | 0.088 | 12.7 | 65 | 15 | yes |
| 1-10 | 0.00 | 1.75 | 0.79 | 0.073 | 11.7 | 0 | 80 | no |
| 1-11 | 0.28 | 1.53 | 0.82 | 0.075 | 11.9 | 10 | 70 | no |

TABLE 1-continued

The Effect of mol % of Components (A) and (B) on Silicone Resin Solubility in Toluene

| Sample | Wt. Parts | | | | | mol % | | Toluene |
|---|---|---|---|---|---|---|---|---|
| No. | (A) | (B) | (D) | (E) | (F) | (A) | (B) | Soluble |
| 1-12 | 0.42 | 1.42 | 0.83 | 0.076 | 12.0 | 15 | 65 | no |
| 1-13 | 1.95 | 0.22 | 0.98 | 0.090 | 12.8 | 70 | 10 | no |
| 1-14 | 2.22 | 0.00 | 1.00 | 0.092 | 12.9 | 80 | 0 | no |

The resins described as Sample 1–3 were further analyzed by $Si^{29}$ and $C^{13}$ NMR and determined to have about 25 mol % SiOH and 5 mol % $SiOR^3$, where $R^3$ is methyl or ethyl.

EXAMPLE 2

Samples 2–1 through 2–6 where prepared the same as the samples described in Example 1 with the following exceptions. The mol % of component (A) was held constant at 30 mol % (1 weight part). The amounts of each of the other components as described in Example 1 is presented in Table 2 along with the toluene solubility of the resulting silicone resin.

TABLE 2

Effect of mol % of Component (C) on Silicone Resin Solubility in Toluene

| Sample | Wt. Parts | | | | | mol % | | Toluene |
|---|---|---|---|---|---|---|---|---|
| No. | (B) | (C) | (D) | (E) | (F) | (B) | (C) | Soluble |
| 2-1 | 1.05 | 1.80 | 1.047 | 0.0960 | 18.8 | 40 | 30 | yes |
| 2-2 | 1.16 | 1.56 | 1.045 | 0.0959 | 17.1 | 44 | 26 | yes |
| 2-3 | 1.29 | 1.26 | 1.046 | 0.0959 | 15.0 | 49 | 21 | yes |
| 2-4 | 1.42 | 0.96 | 1.046 | 0.0959 | 13.0 | 54 | 16 | yes |
| 2-5 | 1.50 | 0.78 | 1.045 | 0.0958 | 11.7 | 57 | 13 | no |
| 2-6 | 1.58 | 0.60 | 1.046 | 0.0959 | 10.5 | 60 | 10 | no |

EXAMPLE 3

Samples 3–1 through 3–3 were prepared according to the method described in Example 1 with Component (C) being either (C-1) hexadecyltrimethoxysilane or (C-2) octyltriethoxysilane as indicated in Table 3. The amount of each of the components (weight parts per weight part of (A)) along with the toluene solubility of the resulting resin in provided in Table 3.

TABLE 3

| Sample No. | (C) type | Wt. Parts (B) | (C) | (D) | (E) | (F) | mol % (A) | (B) | (C) | Toluene Soluble |
|---|---|---|---|---|---|---|---|---|---|---|
| 3-1 | C-1 | 0.99 | 1.80 | 1.05 | 0.096 | 20.13 | 30 | 37.5 | 32.5 | yes |
| 3-2 | C-2 | 0.92 | 1.55 | 1.05 | 0.10 | 13.73 | 30 | 35 | 35 | yes |
| 3-3 | C-2 | 0.63 | 2.92 | 1.24 | 0.11 | 21.88 | 25 | 20 | 55 | yes |

EXAMPLE 4

Preparation of silicone resin using in situ formed hydrogen chloride as hydrolysis catalyst. A silicone resin was formed in a process similar to that described in Example 1 by combining (A) 1 part of tetraethoxysilane, (B) 1.08 parts of trichlorosilane, (C) 1.19 parts of octadecyltrimethoxysilane, (D) 1.03 parts of water, and (F) 14.87 parts of a mixture of MIBK with toluene (85:15 weight ratio). The mixture was refluxed for 5 minutes and volatiles where removed at 40° C. under vacuum. The resulting silicone resin was soluble in toluene as tested by the method described in Example 1.

EXAMPLE 5

Effects of heating and hydrocarbon substitution on weight average molecular weights of silicone resins. Samples 5–1 through 5–6 were prepared by a process similar to that described in Example 1. Component (C) was either (C-1) octadecyltrimethoxysilane or (C-2) octyltriethoxysilane as indicated in Table 4. The mol % of component (C) and components (A) and (B), as described in Example 1, are provided in Table 4. The amounts of components (D) and (E) where the same as described in Example 1. The silicone resin was recovered as a solid by removing volatiles at 30° C. under vacuum. The solid silicone resin was dissolved to 30 weight percent in toluene and heated under reflux, with continuous removal of evolved water, for the times described in Table 4. The weight average molecular weights of the silicone resins were determined before and after heating by GPC and the results are reported in Table 4. The toluene solubility of the silicone resins was determined as described in Example 1, and all resin both before and after heat treatment where toluene soluble.

TABLE 4

Mw Silicone Resins Before and After Heat Treatment

| Sample No. | Type (C) | mol % (A) | (B) | (C) | Time (h) | Mw Pre-heat | Heated |
|---|---|---|---|---|---|---|---|
| 5-1 | C-1 | 30 | 47 | 23 | 1 | 12,700 | 55,000 |
| 5-2 | C-1 | 30 | 47 | 23 | 2 | 12,700 | 91,500 |
| 5-3 | C-1 | 30 | 47 | 23 | 3 | 12,700 | 139,400 |
| 5-4 | C-1 | 30 | 49 | 21 | 1 | 11,600 | 81,500 |
| 5-5 | C-2 | 30 | 30 | 40 | 1 | 5,240 | 23,800 |
| 5-6 | C-2 | 30 | 25 | 45 | 1 | 7,540 | 16,300 |

We claim:

1. A silicone resin comprising the reaction product of a mixture comprising
   (A) 15–70 mol % of a tetraalkoxysilane described by formula $Si(OR^1)_4$, where each $R^1$ is an independently selected alkyl group comprising 1 to about 6 carbon atoms, (B) 12 to 60 mol % of a hydrosilane described by formula $HSiX_3$, where each X is an independently selected hydrolyzable group,
   (C) 15 to 70 mole percent of an organotrialkoxysilane described by formula $R^2Si(OR^3)_3$, where $R^2$ is a hydrocarbon group comprising about 8 to 24 carbon atoms or a substituted hydrocarbon group comprising a hydrocarbon chain having about 8 to 24 carbon atoms and each $R^3$ is an independently selected alkyl group comprising 1 to about 6 carbon atoms; in the presence of
   (D) water,
   (E) hydrolysis catalyst, and
   (F) organic solvent for the reaction product.

2. A method for making a silicone resin comprising forming a mixture to effect formation of a reaction product comprising
   (A) 15–70 mol % of a tetraalkoxysilane described by formula $Si(OR^1)_4$, where each $R^1$ is an independently selected alkyl group comprising 1 to about 6 carbon atoms,
   (B) 12 to 60 mol % of a hydrosilane described by formula $HSiX_3$, where each X is an independently selected hydrolyzable group,
   (C) 15 to 70 mole percent of an organotrialkoxysilane described by formula $R^2Si(OR^3)_3$, where $R^2$ is a hydrocarbon group comprising about 8 to 24 carbon atoms or a substituted hydrocarbon group comprising a hydrocarbon chain having about 8 to 24 carbon atoms and each $R^3$ is and independently selected alkyl group comprising 1 to about 6 carbon atoms; in the presence of
   (D) water,
   (E) hydrolysis catalyst, and
   (F) organic solvent for the reaction product.

3. A silicone resin according to claim 1, where the mixture comprises about 25 mol % to 50 mol % of the tetraalkoxysilane.

4. A silicone resin according to claim 1, were the tetraalkoxysilane is tetramethoxysilane or tetraethoxysilane.

5. A silicone resin according to claim 1, where the mixture comprises about 30 mol % to 50 mol % of the hydrosilane.

6. A silicone resin according to claim 1, where X is an alkoxy group comprising 1 to about 6 carbon atoms.

7. A silicone resin according to claim 1, where the hydrosilane is trimethoxysilane or triethoxysilane.

8. A silicone resin according to claim 1, where the mixture comprises about 15 mol % to 40 mol % of the organotrialkoxysilane.

9. A silicone resin according to claim 1, where $R^2$ is a linear alkyl group comprising about 8 to 24 carbon atoms.

10. A silicone resin according to claim 1, where $R^2$ is a linear alkyl group comprising about 16 to 20 carbon atoms.

11. A silicone resin according to claim 1, where the organotrialkoxysilane is selected from the group consisting of octyltriethoxysilane, octadecyltrimethoxysilane, and hexadecyltrimethoxysilane.

12. A silicone resin according to claim 1, where the mixture comprises about 1.4 to 6 moles of water per mole of components (A)+(B)+(C).

13. A silicone resin according to claim 1, where the mixture comprises about 2.5 to 4.5 moles of water per mole of components (A)+(B)+(C).

14. A silicone resin according to claim 1, where the mixture comprises about 0.02 to 0.5 mole of the hydrolysis catalyst per mole of components (A)+(B)+(C).

15. A silicone resin according to claim 1, where the mixture comprises about 0.1 to 0.3 moles of the hydrolysis catalyst per mole of components (A)+(B)+(C).

16. A silicone resin according to claim 1, where the hydrolysis catalyst is hydrogen chloride.

17. A silicone resin according to claim 1, where the mixture comprises about 70 to 95 weight percent of the organic solvent for the reaction product.

18. A silicone resin according to claim 1, where the mixture comprises about 85 to 95 weight percent of the organic solvent for the reaction product.

19. A silicone resin according to claim 1, where the reaction product comprising the silicone resin is neutralized and the silicone resin is dissolved in an organic solvent and 0.05 to 0.4 weight percent water is added.

20. A silicone resin according to claim 1, where the reaction product comprising the silicone resin is neutralized and the silicone resin is dissolved in an organic solvent and 0.1 to 0.25 weight percent water is added.

21. A silicone resin according to claim 1, where the reaction product comprising the silicone resin in an organic solvent is heated in the presence of an optional condensation catalyst at a temperature sufficient to effect condensation of the silicone resin to a weight average molecular weight of about 100,000 to 400,000.

22. A silicone resin according to claim 1, where the reaction product comprising the silicone resin in an organic solvent is heated in the presence of an optional condensation catalyst at a temperature sufficient to effect condensation of the silicone resin to a weight average molecular weight of about 150,000 to 250,000.

23. A method according to claim 2, where the mixture comprises about 25 mol % to 50 mol % of the tetraalkoxysilane.

24. A method according to claim 2, were the tetraalkoxysilane is tetramethoxysilane or tetraethoxysilane.

25. A method according to claim 2, where the mixture comprises about 30 mol % to 50 mol % of the hydrosilane.

26. A method according to claim 2, where X is an alkoxy group comprising 1 to about 6 carbon atoms.

27. A method according to claim 2, where the hydrosilane is trimethoxysilane or triethoxysilane.

28. A method according to claim 2, where the mixture comprises about 15 mol % to 40 mol % of the organotrialkoxysilane.

29. A method according to claim 2, where $R^2$ is a linear alkyl group comprising about 8 to 24 carbon atoms.

30. A method according to claim 2, where $R^2$ is a linear alkyl group comprising about 16 to 20 carbon atoms.

31. A method according to claim 2, where the organotrialkoxysilane is selected from the group consisting of octyltriethoxysilane, octadecyltrimethoxysilane, and hexadecyltrimethoxysilane.

32. A method according to claim 2, where the mixture comprises about 1.4 to 6 moles of water per mole of components (A)+(B)+(C).

33. A method according to claim 2, where the mixture comprises about 2.5 to 4.5 moles of water per mole of components (A)+(B)+(C).

34. A method according to claim 2, where the mixture comprises about 0.02 to 0.5 mole of the hydrolysis catalyst per mole of components (A)+(B)+(C).

35. A method according to claim 2, where the mixture comprises about 0.1 to 0.3 moles of the hydrolysis catalyst per mole of components (A)+(B)+(C).

36. A method according to claim 2, where the hydrolysis catalyst is hydrogen chloride.

37. A method according to claim 2, where the mixture comprises about 70 to 95 weight percent of the organic solvent for the reaction product.

38. A method according to claim 2, where the mixture comprises about 85 to 95 weight percent of the organic solvent for the reaction product.

39. A method according to claim 2, where the reaction product comprising the silicone resin is neutralized and the silicone resin is dissolved in an organic solvent and 0.05 to 0.4 weight percent water is added.

40. A method according to claim 2, where the reaction product comprising the silicone resin is neutralized and the silicone resin is dissolved in an organic solvent and 0.1 to 0.25 weight percent water is added.

41. A method according to claim 2, where the reaction product comprising the silicone resin in an organic solvent is heated in the presence of an optional condensation catalyst at a temperature sufficient to effect condensation of the silicone resin to a weight average molecular weight of about 100,000 to 400,000.

42. A method according to claim 2, where the reaction product comprising the silicone resin in an organic solvent is heated in the presence of an optional condensation catalyst at a temperature sufficient to effect condensation of the silicone resin to a weight average molecular weight of about 150,000 to 250,000.

* * * * *